(12) United States Patent
Wüllrich et al.

(10) Patent No.: US 10,189,341 B2
(45) Date of Patent: Jan. 29, 2019

(54) TOP OF A CONVERTIBLE VEHICLE COMPRISING PANEL BOWS

(71) Applicant: Webasto SE, Stockdorf (DE)

(72) Inventors: Heinrich Wüllrich, Stockdorf (DE); Magnus Sviberg, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 15/440,805

(22) Filed: Feb. 23, 2017

(65) Prior Publication Data

US 2017/0259653 A1 Sep. 14, 2017

(30) Foreign Application Priority Data

Mar. 9, 2016 (DE) .......................... 10 2016 104 288

(51) Int. Cl.
*B60J 7/14* (2006.01)
*B60J 7/12* (2006.01)

(52) U.S. Cl.
CPC ............. *B60J 7/146* (2013.01); *B60J 7/1204* (2013.01); *B60J 7/1265* (2013.01); *B60J 7/1269* (2013.01); *B60Y 2400/411* (2013.01)

(58) Field of Classification Search
CPC ......... B60J 7/1204; B60J 7/1269; B60J 7/146
USPC ...... 296/107.15, 107.17, 108, 112, 115, 117, 296/107.07, 107.12
See application file for complete search history.

(56) References Cited

U.S. PATENT DOCUMENTS

| 6,425,622 | B2 | 7/2002 | Eberle | |
|---|---|---|---|---|
| 7,607,715 | B2* | 10/2009 | Beierl | B60J 7/1265 296/107.15 |
| 2008/0061593 | A1* | 3/2008 | Beierl | B60J 7/1265 296/118 |
| 2008/0277962 | A1* | 11/2008 | Beierl | B60J 7/1265 296/107.07 |
| 2009/0108623 | A1* | 4/2009 | Haberl | B60J 7/146 296/109 |
| 2011/0049941 | A1* | 3/2011 | Wullrich | B60J 7/146 296/220.01 |

(Continued)

FOREIGN PATENT DOCUMENTS

| DE | 100 06 296 C1 | 5/2001 | |
|---|---|---|---|
| DE | 102004029148 B3 * | 3/2006 | ............. B60J 7/146 |

(Continued)

*Primary Examiner* — Jason S Morrow
(74) *Attorney, Agent, or Firm* — Fitch, Even, Tabin & Flannery, LLP (57) ABSTRACT

A convertible top having a top cover and a cover linkage adjustable between a closed position and a storage position and which has a linkage arrangement on each of its two sides linkage arrangement pivotably mounted on a respective main bearing, which is fixed to the vehicle, via a main multi-joint arrangement comprising two main links, a rear bow realized as a panel bow mounted on each of the bilaterally arranged linkage arrangements via a rear link arrangement. The two bilaterally arranged rear link arrangements can each be actuated by a drive lever, which drives the respective rear link arrangement starting from the closed position in a first opening phase while the main multi-joint arrangement is static and drives the respective rear link arrangement in the opposite direction of the respective main multi-joint arrangement in a second opening phase.

15 Claims, 8 Drawing Sheets

(56) References Cited

U.S. PATENT DOCUMENTS

2017/0334276 A1* 11/2017 Wullrich .................. B60J 7/145

FOREIGN PATENT DOCUMENTS

| DE | 10 2013 114 964 A1 | 7/2015 | | |
|---|---|---|---|---|
| EP | 3118039 A1 | * | 1/2017 | .............. B60J 7/146 |

* cited by examiner

TOP OF A CONVERTIBLE VEHICLE COMPRISING PANEL BOWS

CROSS-REFERENCE TO RELATED APPLICATION

This application claims priority from German Application No. 10 2016 104 288.9, filed Mar. 9, 2016, which is hereby incorporated herein by reference in its entirety for all purposes.

FIELD

The invention relates to a top of a convertible vehicle.

BACKGROUND

A top of this kind is known from practice and can be realized as a so-called panel-bow top, in which a top cover is stretched over so-called panel bows when the top is in the closed position covering a vehicle interior, said panel bows forming a largely continuous support surface for the top cover in the longitudinal direction of the vehicle. This means that the panel bows are panel elements that extend in the transverse direction of the top. They are part of a top linkage which can be adjusted between the closed position covering the vehicle interior and a storage position uncovering the vehicle interior toward the top and which has a linkage arrangement on each of its two sides with respect to a vertical longitudinal center plane of the top, the panel bows being arranged between the linkage arrangements. The two linkage arrangements, which substantially extend in the longitudinal direction of the top, each comprise a main multi-joint arrangement having two main links which are pivotably mounted on the respective main bearing, which is fixed to the vehicle. When the top linkage is in the closed position, one of the panel bows is arranged at the rear and forms a rear bow which can in particular accommodate a rear window and which is mounted on the respective linkage arrangement via a respective rear link arrangement on both sides. In the case of the known panel-bow top, folding the top cover during placement of the top in a rear-side top storage box of the vehicle in question is complicated. Also, the rear window accommodated by the rear bow may only have a limited size. Furthermore, a large fabric portion extends between a main pillar formed by a main link of the main multi-joint arrangement and the rear window when the top is in the closed position, which limits the size of rear-side side windows in the vehicle in question.

SUMMARY

The object of the invention is to provide a top of the kind mentioned above in which an optimal use of storage space in the vehicle in question is possible.

This object is solved according to the invention by the top having the features as described in the exemplary embodiments herein.

In the cover according to the invention, the bilaterally arranged rear link arrangements are driven by means of a respective drive lever. When the top is adjusted from the closed position into the storage position, this drive lever ensures that the rear bow is lifted first, without the main links or the main multi-joint arrangement being pivoted in relation to the main bearings. Thereafter, front-side top portions can be pivoted under the lifted rear bow. Thus, the rear bow is arranged on top when the top is in the storage position. In this way, the storage space provided by the top storage box in question can be optimally used; i.e., the installation space needed for the top in the vehicle in question can be kept small.

The rear bow accommodates in particular a rear window of the top. The rear window can have large dimensions because the dimensions of the rear bow are not limited by the front-side top portions, which can comprise panel bows as well and can be pivoted under the rear bow. This also allows a so-called C-pillar portion of the top to be formed at least partially by the rear bow, making seams of the top cover unnecessary in this portion and allowing a highly aesthetic design of the C-pillar portion. Moreover, compared to previous panel-bow tops, the vehicle in question can be equipped with rear side windows whose size is not limited by the top cover.

In a preferred embodiment of the top according to the invention, the drive lever is connected to a drive link unit which is driven by means of a drive motor in the first opening phase and which is static in relation to the respective main bearing in the second opening phase, so that the drive lever undergoes a pivoting motion through actuation of the main multi-joint arrangement and thus introduces another adjusting torque into the rear link arrangement. The drive motor can be a separate drive motor for the drive lever or can also be the main drive of the top, which acts on the drive link unit of the drive lever in the first opening phase without exerting a drive torque on the main multi-joint arrangement and which acts on the main multi joint arrangement in the second opening phase without exerting a drive torque on the drive link unit of the drive lever.

In an advantageous embodiment of the top according to the invention, the drive link unit takes up a past dead center position when the top linkage is in the closed position so as to ensure that the rear bow realized as a panel bow cannot be shifted in an undesired manner when the top is in the closed position.

In a special embodiment of the top according to the invention, the drive lever drives a coupling link unit on which the rear link arrangement is mounted so as to be able to introduce a large lifting motion into the rear bow. This means that the coupling link unit translates the adjusting motion of the control link into a pivoting motion of the rear link arrangement.

For example, the coupling link unit comprises two intermediate links which are articulated to a center roof link which, in turn, is articulated to the two main links of the main multi-joint arrangement. The rear link arrangement is thus mounted on the center roof link via the coupling link unit.

The intermediate links can form a four-joint arrangement together with the center roof link and a support link, the support link interconnecting two rear links of the rear link arrangement.

Furthermore, one of the intermediate links can be connected to one of the rear links via a support lever so as to stabilize the structure.

In a special embodiment of the top according to the invention, the drive lever is articulated to the support lever. The drive lever thus acts on the support lever, which, in turn, introduces an adjusting motion into the rear link arrangement via the four-joint arrangement composed of the two intermediate links, the center roof link and the support link.

Another subject-matter of the invention is a top of a convertible vehicle comprising a top cover and a top linkage which can be adjusted between a closed position covering a vehicle interior and a storage position uncovering the vehicle interior toward the top and which has a linkage arrangement on each of its two sides with respect to a vertical longitudinal center plane of the top, each linkage arrangement being pivotably mounted on a respective main bearing, which is fixed to the vehicle, via a main multi-joint arrangement comprising two main links, the two main links of the main multi-joint arrangement being articulated to a center roof link to which two front links are articulated on which a front bow is mounted. In addition to the front bow, a center bow realized as a panel bow is also articulated to the two front links. The front links thus serve to mount multiple panel elements of the top linkage, i.e. to mount the front bow, which can be fixed to a forward cowl of the vehicle in question when the top is in the closed position, and to mount the center bow, which is realized as a panel bow and which is preferably adjacent to the rear side edge of the front bow when the top linkage is in the closed position.

In an advantageous embodiment, a control lever whose length defines the position of the center bow during pivoting of the front links is arranged on both sides with respect to the vertical longitudinal center plane of the top between the center bow and one of the two respective front links in order to be able to define the pivoting behavior of the center bow realized as a panel bow during adjustment of the top linkage. The center bow can be articulated to the other one of the two front links via a simple revolute joint.

Another subject-matter of the invention is a top of a convertible vehicle comprising a top cover and a top linkage which can be adjusted between a closed position covering a vehicle interior and a storage position uncovering the vehicle interior toward the top and which has a linkage arrangement on each of its two sides with respect to a vertical longitudinal center plane of the top, each linkage arrangement being pivotably mounted on a main bearing, which is fixed to the vehicle, via a main multi-joint arrangement comprising two main links, the two main links of the main multi-joint arrangement being articulated to a center roof link to which two front links are articulated on which a front bow is mounted, and a coupling rod being articulated to one of the main links, by means of which the front links can be pivoted in relation to the center roof link. A transverse bow realized as a panel bow is articulated to each of the bilaterally arranged coupling rods via two joint arrangements. The coupling rods of the linkage arrangements thus serve not only to actuate the front links for adjusting the front bow in relation to the center roof links but also to mount another panel bow, which can form a support surface for a top cover when the top is in the closed position.

The position of the transverse bow realized as a panel bow during adjustment of the top linkage can be defined in particular in that one of the two joint arrangements comprises a guide link which is articulated to the coupling rod on one side and to the transverse bow on the other side.

To control the transverse bow realized as a panel bow during adjustment of the top linkage, one of the two joint arrangements can comprise a coupling link which is articulated to the coupling rod via a first hinge point, to one of the front links via a second hinge point and to the transverse bow via a third hinge point. Thus, the coupling link is a triangular link which is also used to pivot the front links in relation to the center roof link.

A special embodiment of a top according to the invention is a folding top having four panel bows. In this case, two of these panel bows are preferably mounted on the two front links on both sides with respect to a vertical longitudinal plane of the top. One of the panel bows is the transverse bow and a center bow mounted on the coupling rod, and one of the panel bows is mounted on the center roof link and focus a rear bow. When the top linkage is in the closed position, the four panel bows are located one behind the other in the longitudinal direction of the top. Thus, one of the panel bows is the front bow, one of the panel bows is a forward center bow, one of the panel bows is a rear center bow and one of the panel bows is the rear bow.

Preferably, the top linkage is configured in such a manner that the panel bows are arranged one on top of the other in such a manner that the front bow, the forward center bow and the rear center bow are arranged below the rear bow, that is, from top to bottom in the mentioned order, when the top linkage is in the storage position.

Other advantages and advantageous embodiments of the subject-matter of the invention become apparent from the description, the drawing and the claims.

BRIEF DESCRIPTIONS OF THE DRAWINGS

Embodiments of a top according to the invention are illustrated in a schematically simplified manner in the drawing and will be explained in more detail in the following description.

DETAILED DESCRIPTION

Figure 1:
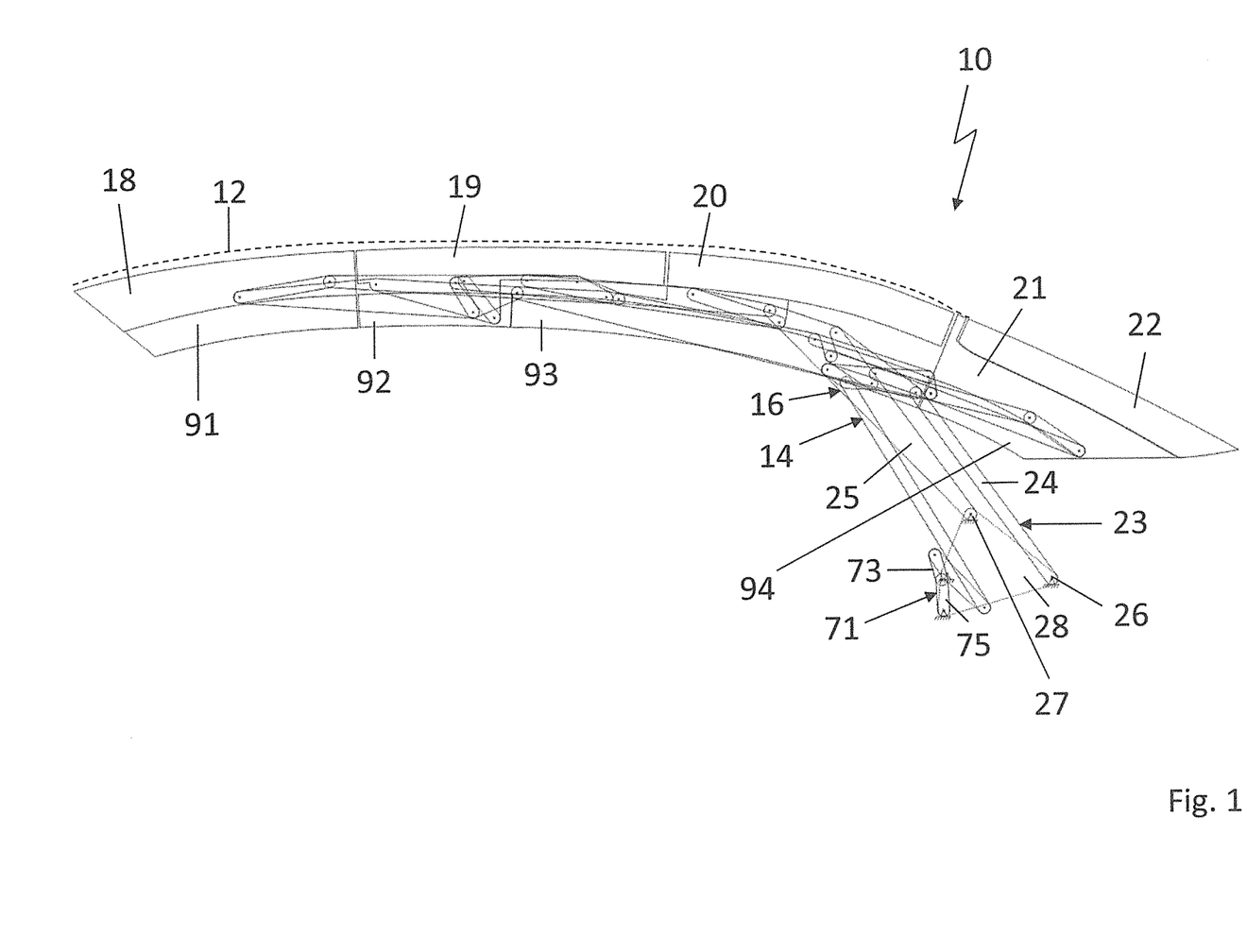
FIG. 1 shows a schematic side view of a top according to the invention in its closed position.
Figure 2:
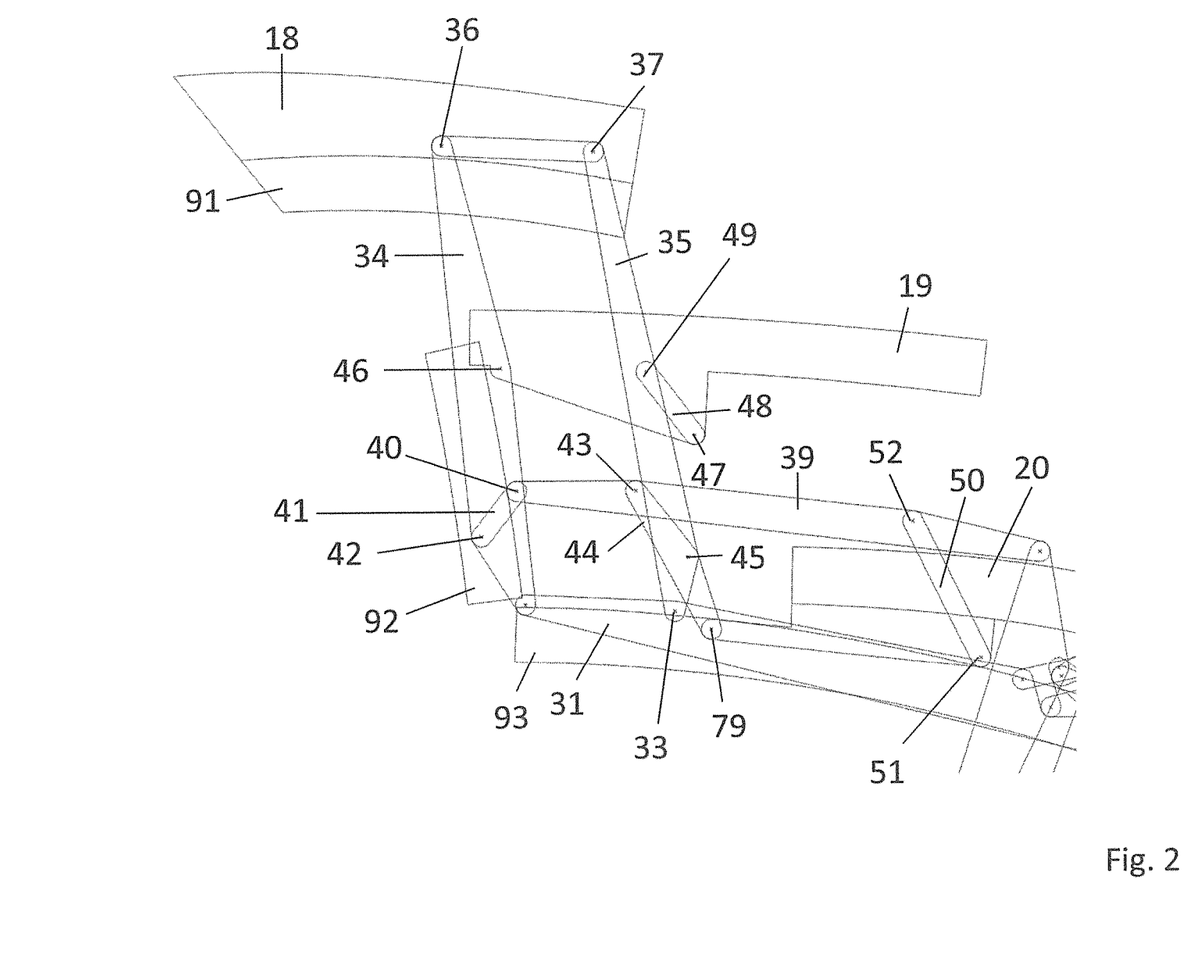
FIG. 2 shows a partial schematic side view of the top of FIG. 1 in a first intermediate position during adjustment into a storage position.
Figure 3:
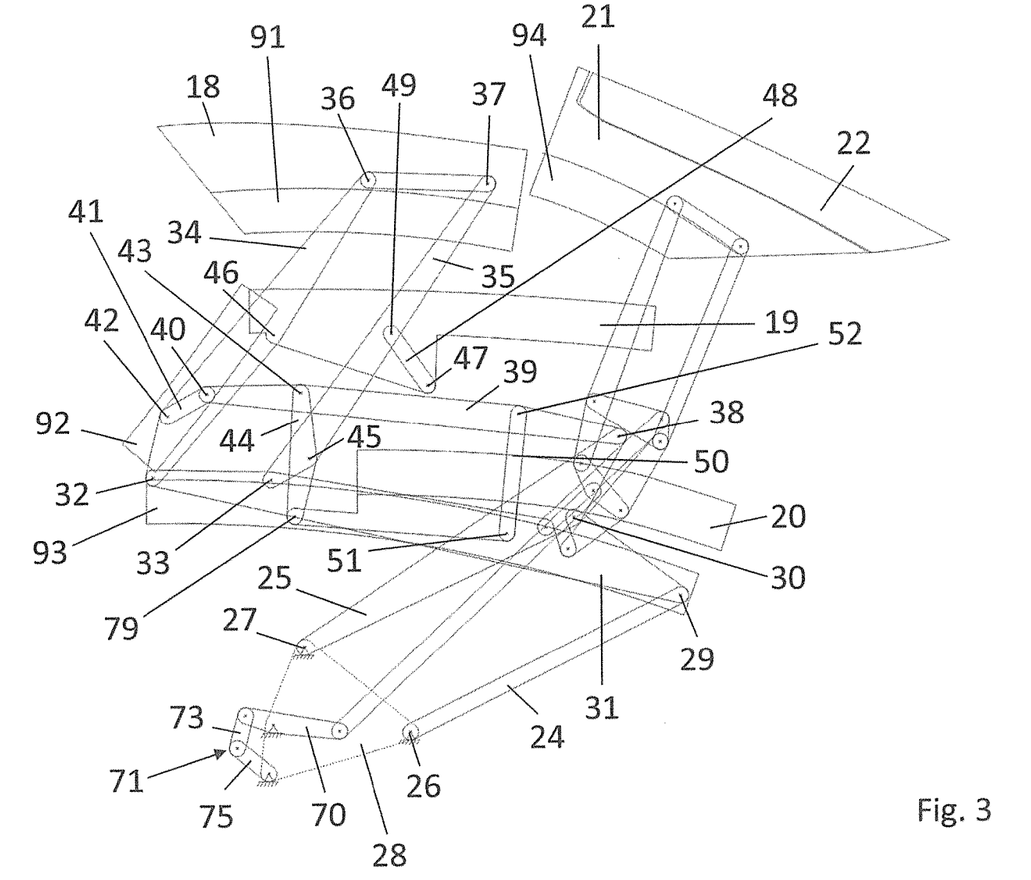
FIG. 3 shows a schematic side view of the top of FIG. 1 in a second intermediate position during adjustment into the storage position.
Figure 4:
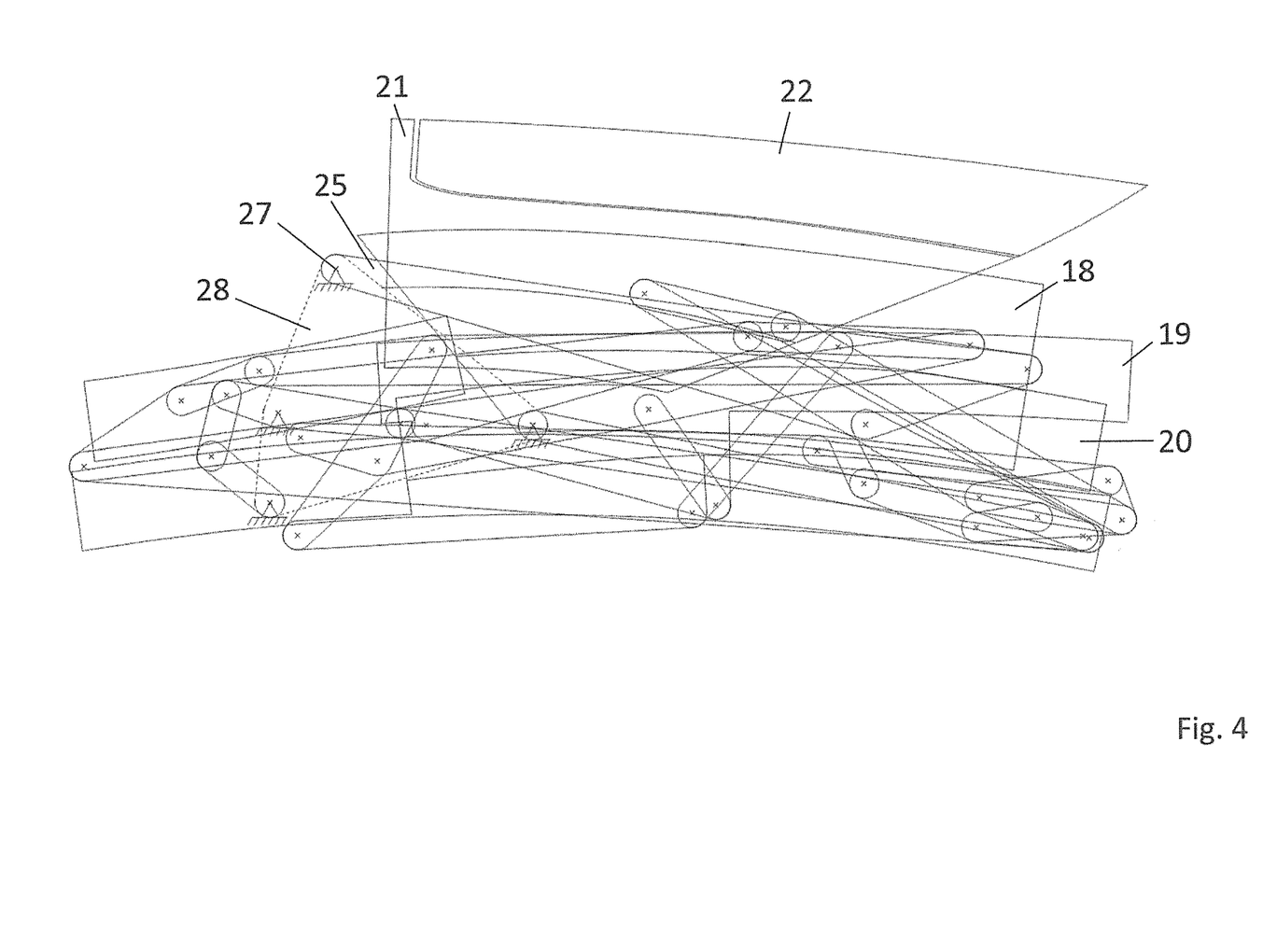
FIG. 4 shows a schematic side view of the top of FIG. 1 in the storage position.
Figure 5:
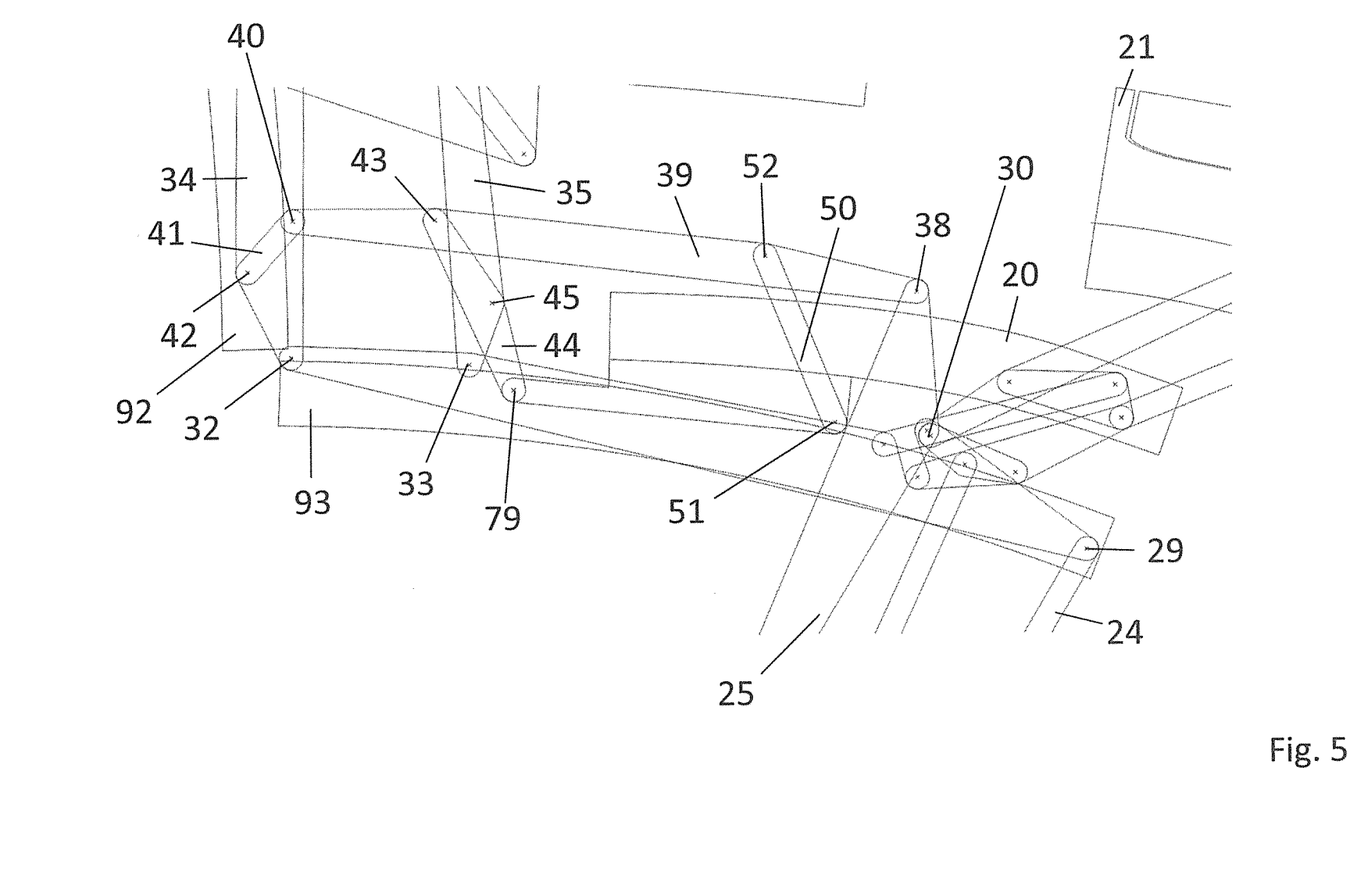
FIG. 5 shows an enlarged illustration of a middle section of the top in the intermediate position illustrated in FIG. 2.

FIGS. 1 to 7 show a top 10 realized as a folding top of a convertible vehicle not illustrated in further detail. The top 10 can be adjusted between a closed position, which is illustrated in FIG. 1 and in which a vehicle interior is covered, and a storage position, which is illustrated in FIG. 4 and in which the interior of the vehicle is uncovered toward the top. In the storage position, the top 10 is stored in a rear-side top storage box of the vehicle in question.

The top 10 comprises a top cover 12, which is illustrated by dashes in FIG. 1 and made of a foldable fabric. To stretch the top cover 12 open, the top 10 comprises a top linkage 14 which comprises a linkage arrangement 16 arranged on both sides with respect to a vertical longitudinal center plane of the top. The bilaterally arranged linkage arrangements 16 are mirror-symmetrical to each other, which is why the following description of the top 10 will refer only to the linkage arrangement that is arranged on the left side with respect to the direction of forward travel of the vehicle in question. The linkage arrangement arranged on the right side with respect to the direction of forward travel of the vehicle is designed correspondingly; hence, it is apparent from the following description as well.

The linkage arrangements serve to actuate four panel bows 18, 19, 20 and 21, which are realized in the fashion of rigid roof shells and form a substantially continuous support surface for the top cover 12 in the closed position illustrated in FIG. 1. In the closed position, the four panel bows 18, 19, 20 and 21 are arranged one behind the other in the longitudinal direction of the top, panel bow 18 forming a front bow, which can be fixed to a forward cowl of the vehicle in question, panel bow 19 forming a forward center bow, panel bow 20 forming a rear center bow and panel bow 21 forming a rear bow, which accommodates a rear window 22. In the storage position, which is illustrated in FIG. 4, the panel bows 18, 19, 29 and 21 are arranged one on top of the other in a stack, the panel bow 21 forming the rear bow being arranged on top, followed by the panel bow 18 forming the front bow, the latter followed by panel bow 19 and by panel bow 20, which is arranged at the bottom.

The bilaterally arranged linkage arrangements 16 each comprise a main four-joint 23, which forms a main multi-joint arrangement and has a main link 24 and a main link 25, which is the main pillar. The two main links 24 and 25 are each pivotably mounted on a main bearing 28 via a revolute joint 26 and 27, respectively.

The two main links 24 and 25 are connected to a center roof link 31, which is part of a center roof-frame element, via revolute joints 29 and 30.

Two front links 34 and 35 are articulated to center roof link 31 via revolute joints 32 and 33 in a front-side section, the panel bow 18 forming the front bow being mounted on the ends of the two front links 34 and 35 that face away from revolute joints 32 and 33 via revolute joints 36 and 37.

To be able to pivot the two front links 34 and 35 in relation to center roof link 31, a coupling rod 39 is articulated to main link 24 via a revolute joint 38, coupling rod 39 being connected to a coupling link 41 via a revolute joint 40 on the one hand, the end of coupling link 41 that faces away from revolute joint 40 being articulated to front link 34 via a revolute joint 42. On the other hand, coupling rod 39 is connected to a coupling link 44 via a revolute joint 43, coupling link 44 being realized as a triangular link and articulated to front link 35 in a revolute joint 45.

In addition to the panel bow 18 forming the front bow, the panel bow 19 forming the forward center bow is mounted on the two front links 34 and 35 in such a manner that it is articulated directly to front link 34 via a simple revolute joint 46 and connected to a control lever 48 via a hinge point 47, control lever 48 being articulated to front link 35 in a hinge point 49. The position of panel bow 19 in relation to front links 34 and 35 during pivoting of front links 34 and 35 can be defined through the length of control lever 48.

The panel bow 20 forming the rear center bow is articulated to coupling rod 39 via two joint arrangements. One of these joint arrangements is formed by a guide link 50, one end of which is articulated to panel bow 20 via a hinge point 51 and the other end of which is articulated to coupling rod 39 via a hinge point 52. The other joint arrangement is formed by coupling link 44, which is articulated to coupling rod 39 in revolute joint 43 and articulated to panel bow 20 in a revolute joint 79.

Figure 6:
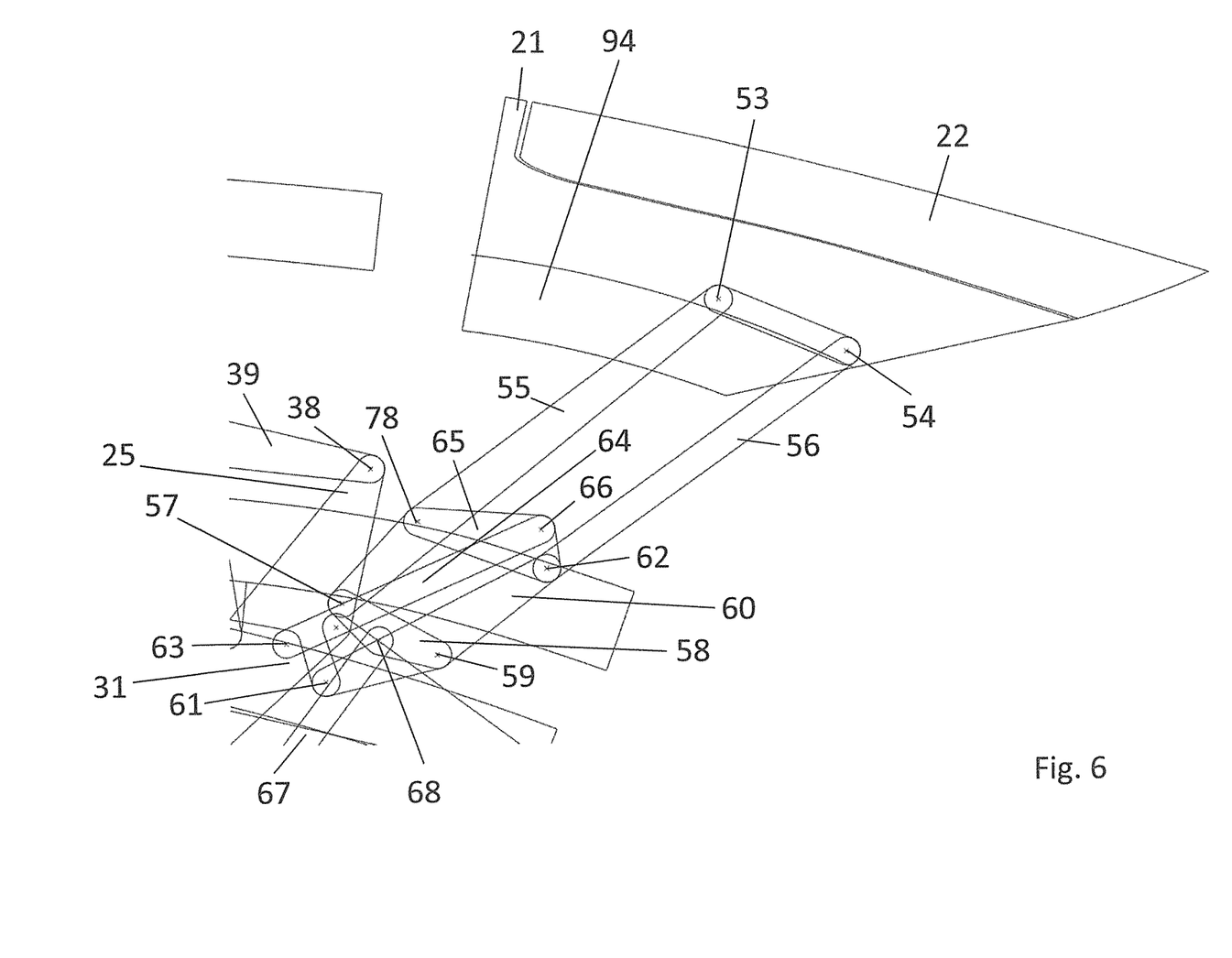
FIG. 6 shows an enlarged illustration of a rear-bow portion of the top of FIG. 1 in an intermediate position during adjustment into a storage position.

As can be seen in particular in FIG. 6, the panel bow 21 forming the rear bow is articulated to two rear links 55 and 56, which form a rear link arrangement, via two revolute joints 53 and 54. The end of rear link 55 facing away from revolute joint 53 is supported in a hinge point 57 on a support lever 58, which is pivotably mounted on an intermediate link 60 in a revolute joint 59. Intermediate link 60 is supported in a hinge point 61 on center roof link 31 and is connected to rear link 56 via a revolute joint 62. Another intermediate link 64 is supported on center roof link 31 in a hinge point 63, said intermediate link 64 forming a four-joint arrangement together with intermediate link 60, center roof link 31 and a support link 65, to which intermediate link 64 is articulated in a revolute joint 66 and which is connected to rear link 55 via a revolute joint 78. Support link 65 is connected to rear link 56 and intermediate link 60 in revolute joint 62. Thus, the four-joint arrangement formed by center roof link 31, the two intermediate links 60 and 64 and support link 65 is connected upstream of a four-joint arrangement that is formed by the two rear links 55 and 56, panel bow 21 and support link 65 and which is additionally supported in hinge point 57 on support lever 58 via rear link 55.

Figure 7:
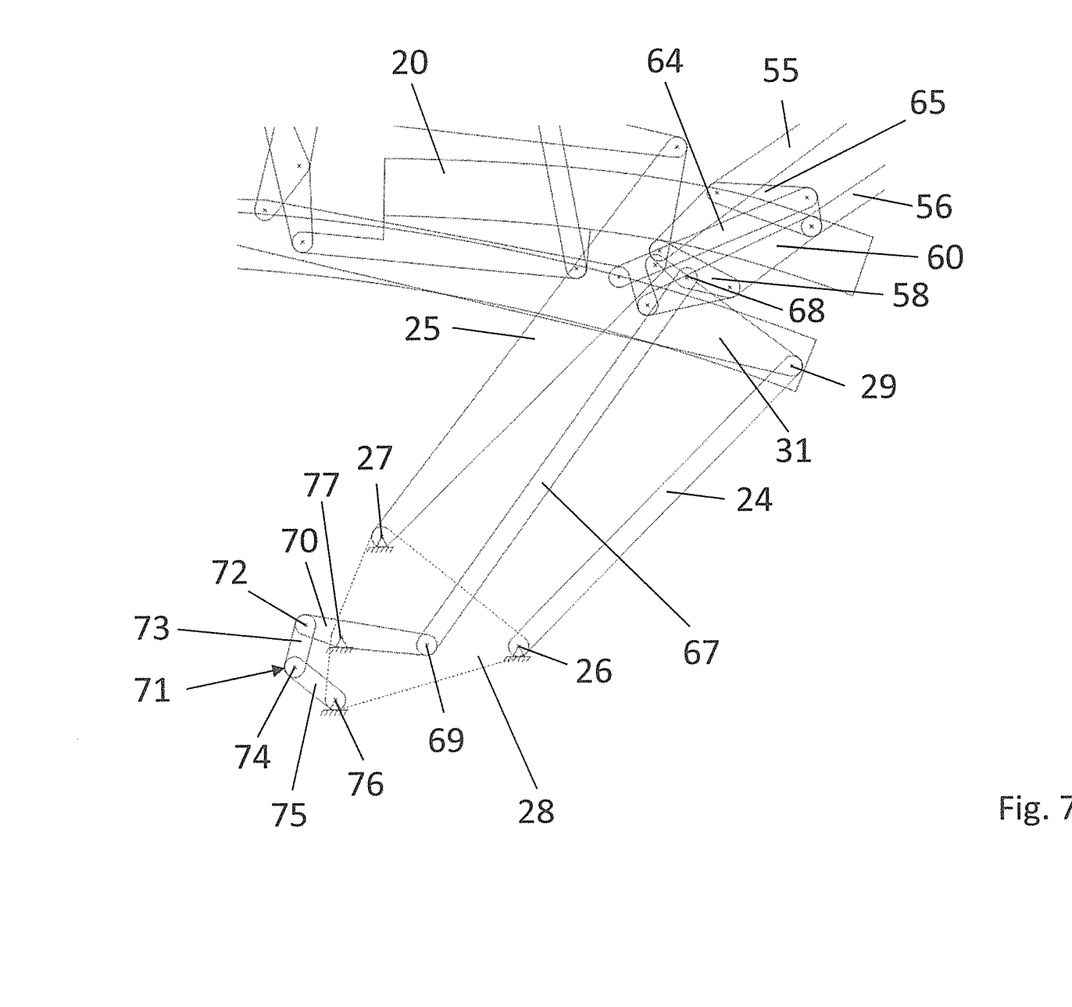
FIG. 7 shows an enlarged illustration of a main bearing and main four-joint portion of the top of FIG. 1 in the intermediate position illustrated in FIG. 6.

As can be seen in particular in FIG. 7, top linkage 14 has a drive lever 67 for driving panel bow 21, said drive lever 67 being articulated to support lever 58 in a hinge point 68, support lever 58 thus forming a triangular link. At its end facing away from hinge point 68, drive lever 67 is connected to a link 70 of a drive link unit 71 via a revolute joint 69, drive link 70 being connected to a link 73 via a hinge point 72, said link 73 in turn being connected to a link 75 via a hinge point 74, link 75 being pivotable about a hinge point 76, which is fixed to the main bearing. Link 70 can be pivoted in the manner of a rocker about a hinge point 77, which is fixed to the main bearing. Link 75 can be driven by means of a drive motor (not illustrated) attached to the main bearing 28, link 75 thus forming the driven link of the drive link unit 71 formed by links 70, 73 and 75.

Is the closed position illustrated in FIG. 1, the two links 73 and 75 or, more precisely, the hinge point 74 connecting them takes up a past dead center position, which prevents panel bow 21 from being actuated in an undesired manner.

A seal 91 is arranged on the front bow or panel bow 18, said seal 91 being flush with seals 92, 93 and 94, which are arranged on front link 34, on center roof link 31 and on the rear bow or panel bow 21, when the top 10 is in the closed position.

The top 10 described above works in the manner described below.

Starting from the closed position illustrated in FIG. 1, in which the panel bows 18, 19, 20 and 21 are arranged one behind the other and the top cover 12 is supported on them in a stretched manner, a main drive motor is actuated so that link 75 of drive link unit 71 is pivoted counter-clockwise in the orientation illustrated in the drawing. In this way, link 70 is pivoted about hinge point 77, whereby an adjusting force is introduced via the drive lever 67 into the four-joint arrangement formed by intermediate links 60 and 64, center roof link 31 and support link 65, which, in turn, causes a counter-clockwise pivoting motion of rear links 55 and 56, whereby the rear bow or panel bow 21 is lifted.

In this first opening phase, main links 24 and 25 are not actuated. In a subsequent second opening phase, link 70 of drive link unit 71 is static and main links 24 and 25 are pivoted clockwise by the main drive motor of the top 10. In this way, an adjusting force is introduced into front links 34 and 35 via coupling rod 39, whereby they are pivoted clockwise in relation to center roof link 31. Thus, panel bows 18 and 19 are pivoted under panel bow 21. At the same time, the rear center bow or panel bow 20 is pivoted in relation to coupling rod 39 by means of guide link 50 and by means of coupling link 44. At the end of the second opening phase, the storage position is reached, in which the panel bows 18, 19, 20 and 21 are arranged in a stacked manner in the top storage box. The storage position is shown in FIG. 4.

The top 10 is adjusted from the storage position into the closed position in the analogously reversed manner.

Figure 8:
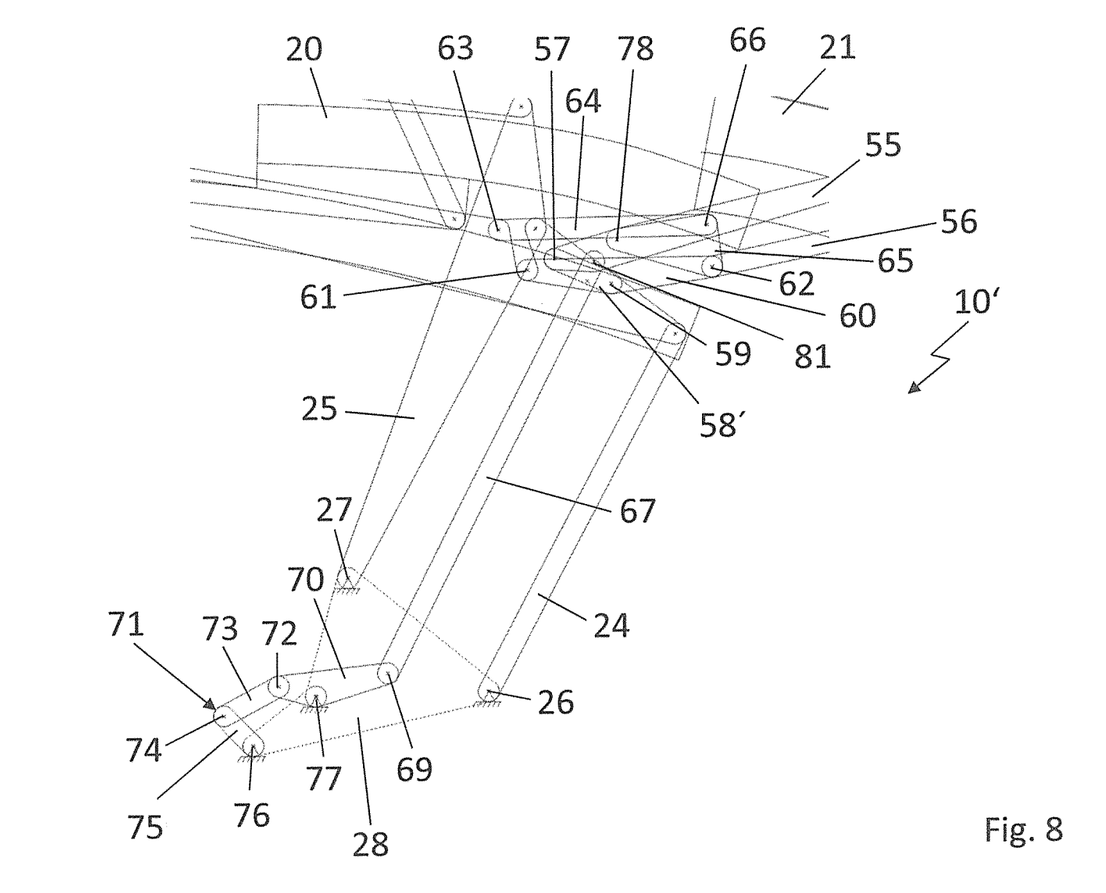
FIG. 8 shows an illustration of a main bearing and main four-joint portion of an alternative embodiment of a top according to the invention.

In FIG. 8, an alternative embodiment of a top 10' is illustrated, which largely corresponds to the embodiment of FIGS. 1 to 7 but differs therefrom in that it has a drive lever 67 which is articulated to rear link 55 in a hinge point 81. Furthermore, it has a support lever 58' which has only two revolute joints, namely a first hinge point 57 on rear link 55 and a second revolute joint 59 on intermediate link 60.

Otherwise, top 10' corresponds to top 10 according to FIGS. 1 to 7 in terms of structure and function.

The invention claimed is:

1. A top of a convertible vehicle, comprising a top cover and a top linkage which is adjustable between a closed position covering a vehicle interior and a storage position uncovering the vehicle interior toward the top and which has a linkage arrangement on each of its two sides with respect to a vertical longitudinal center plane of the top, each linkage arrangement being pivotably mounted on a respective main bearing, which is fixed to the vehicle, via a main multi-joint arrangement comprising two main links, a rear bow realized as a panel bow being mounted on each of the bilaterally arranged linkage arrangements via a rear link arrangement, said rear bow being arranged at the rear when the top linkage is in the closed position and extending in the transverse direction of the top, wherein the two bilaterally arranged rear link arrangements are each actuable by a drive lever which drives the respective rear link arrangement in a first opening phase starting from the closed position while the main multi-joint arrangement is static and which drives the respective rear link arrangement in the opposite direction of the respective main multi-joint arrangement in a second opening phase, and wherein the top linkage comprises at least four panel bows.

2. The top according to claim 1, wherein the drive lever is connected to a drive link unit which is driven by a drive motor in the first opening phase and is static in relation to the respective main bearing in the second opening phase so that the drive lever undergoes a pivoting motion due to the actuation of the main multi-joint arrangement.

3. The top according to claim 2, wherein the drive link unit takes up a past dead center position when the top linkage is in the closed position.

4. The top according to claim 1, wherein the drive lever drives a coupling link unit on which the rear link arrangement is mounted.

5. The top according to claim 4, wherein the coupling link unit comprises two intermediate links which are articulated to a center roof link which is articulated to the two main links of the main multi-joint arrangement.

6. The top according to claim 5, wherein the two intermediate links form a four-joint arrangement together with the center roof link and a support link, the support link interconnecting two rear links of the rear link arrangement.

7. The top according to claim 6, wherein one of the intermediate links is connected to one of the rear links via a support lever.

8. The top according to claim 7, wherein the drive lever is articulated to the support lever.

9. A top of a convertible vehicle, comprising a top cover and a top linkage which are adjustable between a closed position covering a vehicle interior and a storage position uncovering the vehicle interior toward the top and which has a linkage arrangement on each of its two sides with respect to a vertical longitudinal center plane of the top, each linkage arrangement being pivotably mounted on a respective main bearing, which is fixed to the vehicle, via a main multi-joint arrangement comprising two main links, the two main links of the main multi-joint arrangement being articulated to a center roof link to which two front links are articulated on which a front bow is mounted, wherein a center bow realized as a panel bow is mounted on the two front links, and wherein the top linkage comprises at least four panel bows.

10. The top according to claim 9, wherein a control lever is arranged on both sides with respect to the vertical longitudinal center plane of the top between the center bow and one of the two front links, the length of the control lever defining the position of the center bow during pivoting of the front links.

11. A top of a convertible vehicle, comprising a top cover and a top linkage which are adjustable between a closed position covering a vehicle interior and a storage position uncovering the vehicle interior toward the top and which has a linkage arrangement on each of its two sides with respect to a vertical longitudinal center plane of the top, each linkage arrangement being pivotably mounted on a respective main bearing, which is fixed to the vehicle, via a main multi-joint arrangement comprising two main links, the two main links of the main multi-joint arrangement being articulated to a center roof link to which two front links are articulated on which a front bow is mounted, and a coupling rod being articulated to one of the main links the front links are pivotable in relation to the center roof link, wherein a transverse bow realized as a panel bow is articulated to the coupling rod on each of its two sides via two joint arrangements, and wherein the top linkage comprises at least four panel bows.

12. The top according to claim 11, wherein one of the two joint arrangements comprises a guide link which is articulated to the coupling rod on one side and to the transverse bow on the other side.

13. The top according to claim 11, wherein one of the two joint arrangements comprises a coupling link which is articulated to the coupling rod via a first revolute joint, to one of the front links via a second revolute joint and to the transverse bow via a third revolute joint.

14. The top according to claim 9, wherein the panel bows are arranged one on top of the other when the top linkage is in the storage position, the front bow, the forward center bow and the rear center bow being arranged below the rear bow.

15. The top of a convertible vehicle according to claim 1, wherein the at least four panel bows comprises four panel bows, of which two are mounted on two front links on both sides with respect to the vertical longitudinal center plane of the top, one is mounted on a coupling rod and one is mounted on a center roof link and which are arranged one behind the other in the longitudinal direction of the top when the top linkage is in the closed position, one of the panel bows being a front bow, one of the panel bows being a forward center bow, one of the panel bows being a rear center bow and one of the panel bows being the rear bow.

* * * * *